(12) United States Patent
Schimper et al.

(10) Patent No.: US 9,699,014 B2
(45) Date of Patent: *Jul. 4, 2017

(54) DIGITAL MODULATION JITTER COMPENSATION FOR POLAR TRANSMITTER

(75) Inventors: Markus Schimper, Moosinning (DE); Franz Kuttner, St. Ulrich (AT)

(73) Assignee: Infineon Technologies AG, Neubiberg (DE)

( * ) Notice: Subject to any disclaimer, the term of this patent is extended or adjusted under 35 U.S.C. 154(b) by 419 days.

This patent is subject to a terminal disclaimer.

(21) Appl. No.: 13/412,533

(22) Filed: Mar. 5, 2012

(65) Prior Publication Data

US 2012/0170673 A1    Jul. 5, 2012

Related U.S. Application Data

(63) Continuation of application No. 12/262,335, filed on Oct. 31, 2008, now Pat. No. 8,130,865.

(51) Int. Cl.
*H04L 27/36* (2006.01)
(52) U.S. Cl.
CPC .......... *H04L 27/361* (2013.01); *H04L 27/367* (2013.01)
(58) Field of Classification Search
CPC .......................... H04L 27/361; H04L 27/367
See application file for complete search history.

(56) References Cited

U.S. PATENT DOCUMENTS

| | | | |
|---|---|---|---|
| 6,141,352 A | 10/2000 | Gandy | |
| 6,724,831 B1* | 4/2004 | Hasegawa et al. | 375/297 |
| 7,274,748 B1* | 9/2007 | Khlat | H03F 1/0222 |
| | | | 375/296 |
| 8,130,865 B2* | 3/2012 | Schimper et al. | 375/296 |
| 2002/0150171 A1* | 10/2002 | Myers | 375/296 |
| 2003/0215025 A1* | 11/2003 | Hietala | 375/297 |

(Continued)

OTHER PUBLICATIONS

Prosecution History from U.S. Appl. No. 12/262,335, filed Oct. 31, 2008, including the following documents and the associated cited documents and content of those documents, Oct. 31, 2008 Information Disclosure Statement (IDS) Form (SB08)); Jun. 8, 2011 List of references cited by examiner; Oct. 28, 2011 Applicant summary of interview with examiner; Nov. 3, 2011 List of references cited by examiner; Nov. 3, 2011 Notice of Allowance and Fees Due (PTOL-85); Nov. 3, 2011 Examiner initiated interview summary (PTOL-413B).

(Continued)

*Primary Examiner* — Kenneth Lam
(74) *Attorney, Agent, or Firm* — Shumaker & Sieffert, P.A.

(57) ABSTRACT

This disclosure is directed towards techniques and methods of suppressing the effect of modulated clock jitter in a digital to analog conversion (DAC) circuit of a polar modulator in a transceiver. A phase locked loop (PLL) in a modulator circuit may introduce a deterministic jitter in DAC generated pulses which may lead to amplitude variations in the DAC generated pulses. The clock jitter may change the duty cycle of the input amplitude to the DAC which may result in a variation of the output of the DAC generated pulse. A digital pre-distortion or digital multiplier circuit may be introduced before the DAC circuit to increase or decrease the DAC amplitude to compensate for the pulse width modulation.

12 Claims, 5 Drawing Sheets

(56) References Cited

U.S. PATENT DOCUMENTS

2006/0229036 A1* 10/2006 Muller et al. .............. 455/114.3
2009/0023402 A1* 1/2009 Shimizu ................ H03F 1/3282
                                                        455/102
2009/0074106 A1* 3/2009 See et al. ...................... 375/297

OTHER PUBLICATIONS

Staszewski et al., "All-Digital PLL and Transmitter for Mobile Phones," IEEE Journal of Solid-State Circuits, vol. 40, No. 12, Dec. 2005, pp. 2469-2482.

* cited by examiner

DIGITAL MODULATION JITTER COMPENSATION FOR POLAR TRANSMITTER

RELATED APPLICATION

This application is a Continuation Application of co-pending application Ser. No. 12/262,335, which was filed on Oct. 31, 2008. The entire contents of the co-pending Application is incorporated herein by reference.

BACKGROUND

Cellular networks today have evolved beyond pure means of speech services to services that include electronic mail, video communication, Internet surfing, etc. A consequence of such services includes higher power efficiency and higher data rates transfer in the cellular system. In Universal Mobile Telecommunications System (UMTS) cellular standard, Global System for Mobile Communications (GSM), Enhanced Data rates for GSM Evolution (EDGE) and Bluetooth, wireless communications imposes especially demanding requirements in terms of spectral quality of the modulation and the high bandwidth of the signals processed. The spectral quality of the modulation may include signal to noise ratio (SNR), bit error rate (BER), and spectral mask requirements, such that an efficient transmission and receiving of data transfer may be achieved. The high bandwidth of the signals processed may allow a relatively higher amount of data transfer for transmitting and receiving to accommodate the additional features in the cellular networks.

Polar transmitter architectures have certain advantages over other architectures. Such advantages may include the use of a non-linear power amplifiers, use of efficient power amplifiers, and reduced number of analogue components (e.g., filters and mixers). For example, a non-linear amplifier may produce an output that may not be directly proportional to the input, resulting in a better power efficiency for constant amplitude phase modulation compared to a linear power amplifier.

A polar transmitter may use a polar modulator in a transceiver to modulate the carrier frequency in transmitting the baseband data signals. The transceiver may be a component of wireless communications devices used for transmission and receiving of data. The polar modulator operates on a polar representation of the baseband data signal expressed in magnitude and phase.

A modulation of the baseband data signal to the carrier frequency may be performed by a phase-locked-loop component or PLL. In an implementation, the PLL may be a control system that generates a modulated signal having a fixed relation to the phase of a reference frequency or phase input signal. The PLL may also generate clock signals for devices such as a digital to analog converter (DAC) in the polar modulator circuit.

A modulated clock signal may be generated by the PLL to be used in the DAC, such that the amplitude of a carrier signal oscillation changes only during a zero crossing and that the amplitude remains synchronous with the phase. However, modulated clock signals generated by the PLL may have a superimposed phase noise that includes jitter of the clock edges. The jitter is not due to thermal noise or random effects, but is due to phase modulation in the PLL.

In polar transmitters, this type of clock jitter may have a greater affect on the DAC performance than other non idealities in circuit implementation. The clock jitter in the DAC may be a form of short variation in timing with respect to the ideal time position of the clock edges. The short variation may affect the duty cycle of the amplitude in the DAC circuit. The variation in duty cycle may result in a charge pulse error which may affect data transmission quality.

In certain implementations, a method used to minimize or eliminate the effect of the by modulation introduced clock jitter includes a pre-distortion to compensate the amount of clock jitter. The pre-distortion may sample or simulate the output of the jittered DAC pulse at a relatively high sampling rate to be able to represent small time jitter. The samples representing the small time jitter may be sent to the pre-distortion circuit through a prediction control. The pre-distortion may transmit a compensated signal to minimize or eliminate the effect of the clock jitter in the DAC pulse based on the calculated amount from the prediction control.

A pre-distortion may have a problem with the high sampling rate of the jittered output in the DAC generated pulses. The oversampling rate may immediately lead to high current consumption and to difficulties in circuit implementation. Therefore, the pre-distortion is implemented before interpolation on low clock frequency. Not using the digital pre-distortion may lead to an increase in the spectrum in proximity of the carrier. Analog counter measure to avoid the increase in spectrum may require a high quality analog filter that would have to be configurable for various channel frequencies and standards. Furthermore, the high quality filter may not be implemented in analog, for carrier frequencies from 800 Mhz to 3 Ghz.

The clock jitter in the DAC may be considered as an error signal in amplitude of the DAC pulse. The error signal in amplitude of the DAC pulse may be compensated using a digital pre-distortion or sometimes called digital multiplier circuit that may increase the amount of the input amplitude in the DAC circuit. The smaller pulse width may compensate the amplitude variations that may be caused by the clock jitter in the DAC generated pulses.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure is directed towards techniques and methods of suppressing the effect of modulated clock jitter in a digital to analog conversion (DAC) circuit of a polar modulator in a transceiver. A phase locked loop (PLL) in a modulator circuit may introduce a deterministic jitter in DAC generated pulses which may lead to amplitude variations in the DAC generated pulses. The clock jitter may change the duty cycle of the input amplitude to the DAC which may result in a variation of the output of the DAC generated pulse. A digital pre-distortion or digital multiplier circuit may be introduced before the DAC circuit to increase or decrease the DAC amplitude to compensate for the pulse width modulation. The smaller pulse width resulting from the increased pre-distortion amplitude may compensate for the effect of the clock jitter.

Figure 1:
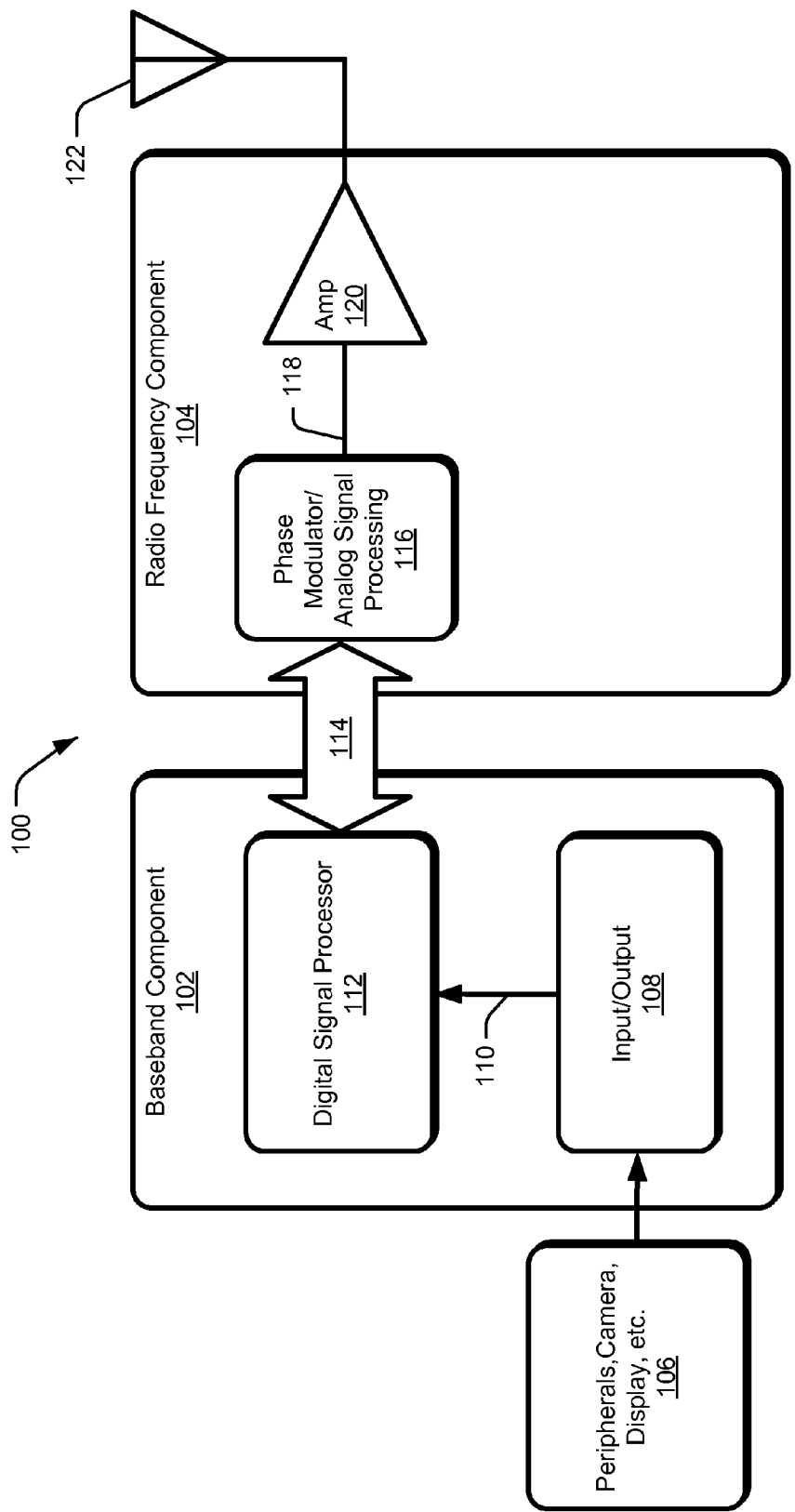
FIG. 1 is a block diagram illustrating a transceiver of a polar transmitter.

FIG. 1 illustrates a transceiver 100 that includes a baseband component 102 and a Radio. Frequency (RF) component 104 providing transmission and reception of data. The transceiver 100 or a part of the transceiver 100 may be considered as a polar transmitter, as discussed further below. The baseband component 102 may be used to modulate a carrier frequency of the RF component 104 with a baseband signal. During demodulation, the baseband component 102 re-creates the baseband signal. The RF component 104 may use a phase modulator/analog signal processing with digital pre-distortion circuit to produce a modulated RF signal. The modulated RF signal may contain a phase modulated signal combined with amplitude modulation for polar transmitters. During demodulation, the RF component 104 may filter and amplify the received modulated RF signal for the baseband component 102 to re-create the baseband signal.

A signal from peripherals, camera, display etc. 106 may be received by Input/Output component (I/O) 108 for initial processing. The I/O component 108 may convert analog data signals into digital data signals, while the digital data signals may be maintained in the same state (i.e., remain digital). The I/O component 108 may process the data signals to produce the amplitudes of the In-phase signal (I) and Quadrature phase signal (Q).

The data signals may pass signal 110 is received by a digital signal processor (DSP) 112. The DSP 112 may use a filter to limit the bandwidth forming a spectrum of the equivalent low pass signal or baseband signal. The DSP 112 may include a Coordinate Rotation DIgital Computer (CORDIC) component to transform the amplitudes of I and Q of the baseband signal into equivalent polar representations before the baseband signals may be interfaced to the RF component 104. A CORDIC is used to transform the amplitudes of I and Q data signals into a polar equivalence. The polar equivalence may contain the phase angle of the baseband data signal and the magnitude of the baseband data signal.

A data signal from the DSP 112 is transmitted to Phase Modulator/Analog Signal Processing component 116 for modulation through a bi-directional interface or connection 114. The connection 114 may be a digital interface for high speed serial link transmission of data signals between the baseband component 102 and the RF component 104.

The baseband data signal may be processed by the Phase Modulator/Analog Signal Processing component 116 to produce a modulated RF signal. The modulated RF signal may use phase variations of the carrier frequency in order to transmit the information signal. The amplitude modulation may be used for exact trajectory of the modulated RF signal. In an implementation, the Phase Modulator/Analog Signal Processing component 116 includes a PLL to phase modulate the signal and a digital pre-distortion circuit to compensate for the clock jitter in the DAC generated pulses.

The modulated RF signal 118 may be received at amplifier 120. The amplifier 120 may include additional filtering to avoid further harmonic and periodic spectral distortions in the modulated RF signal. Furthermore, the amplifier 120 may amplify the modulated RF signal for efficient transmission. An antenna 122 may be used to transmit the modulated RF signal that were amplified and filtered by amplifier 120.

Figure 2:
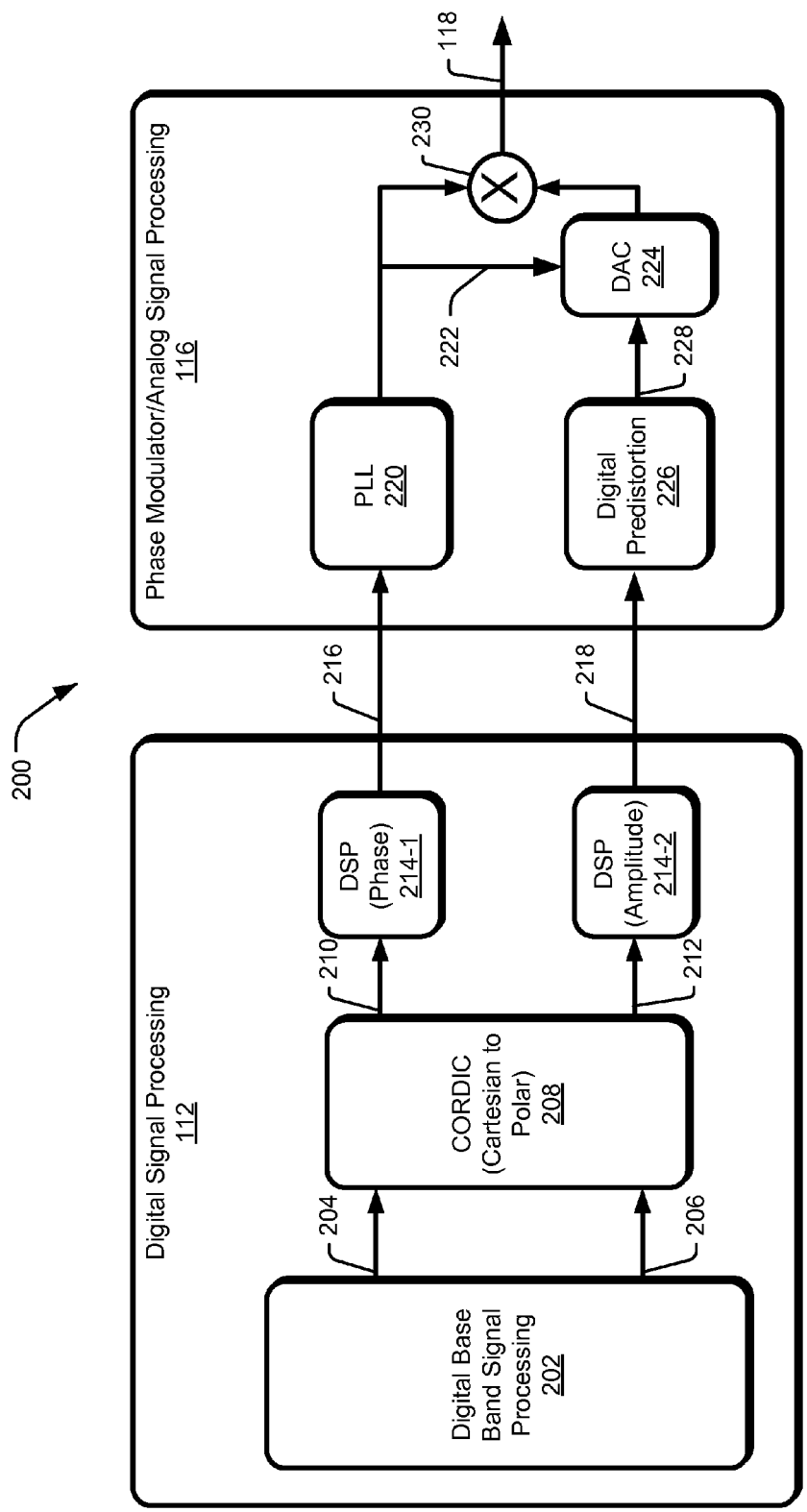
FIG. 2 is a block diagram of a polar modulator illustrating the process of phase modulation with the digital pre-distortion or digital multiplier circuit of a polar transmitter.

FIG. 2 illustrates a polar transmitter 200 that provides transformation of the data signals by DSP 112 and a modulation by Phase Modulator/Analog Signal Processing component 116. Digital baseband signal processing component 202 may filter the amplitudes of I and Q of the data signals in order to produce the equivalent low pass data signal or the baseband data signal. The digital baseband signal processing component 202 provides a baseband data signal that includes the amplitude of I, as represented by signal 204, and a baseband data signal that includes the amplitude of Q, as represented by signal 206. Signals 204 and 206 are received by a CORDIC 208.

The CORDIC 208 transforms the amplitudes of I and Q into their polar equivalence, which include the phase and amplitude of the baseband data signal. The equivalent phase of the baseband data signal may be represented by signal 210, and the equivalent amplitude of the baseband data signal may be represented by signal 212.

A DSP (Phase) component 214-1 may act as a differentiator circuit to produce a modulating frequency for the PLL. The DSP (Phase) component 214-1 (i.e., differentiator circuit) may provide an output that includes a proportional change to the rate of change of the input signal, where for example, the output modulating frequency may be represented by signal 216.

A DSP (Amplitude) component 214-2 may filter the amplitude, where a signal 218 includes the amplitude, but not the phase. The signal 218 may include the baseband data signal amplitude without the increase in amplitude in the digital pre-distortion or digital multiplier circuit.

A PLL 220 may receive signal 216 and processes the modulating frequency of signal 216 to synthesize the carrier frequency. The PLL 220 may produce a phase modulated signal, as represented by signal 222. Signal 222 generates/provides modulated clock pulses which are received by DAC circuit 224. The modulated clock pulses may assure that the amplitude of the phase signal oscillations changes during a zero crossing and that the amplitude remains synchronous with the phase.

In an implementation, DAC circuit 224 converts the digital amplitude signal into analog amplitude signals for the amplitude modulation of the carrier signal. For phase modulation, the amplitude of the DAC output for a single pulse may be made constant. Variations in the amplitude of a DAC pulse may affect the proper transmission of modulated RF signal.

Pre-distortion may use calculation of, a jitter error signal, such that the amount of the jitter error signal may be passed through a prediction control. The feedback loop control may transmit the jitter error signal to the pre-distortion circuit and the pre-distortion circuit may apply compensating signals to minimize or eliminate the jitter error signal.

A digital pre-distortion circuit 226 may take the form of a digital multiplier circuit, since the digital pre-distortion increases, the regular amplitude to pre-distortion amplitude. The pre-distortion amplitude as represented by signal 228 may contain an increase in amplitude amount due to digital pre-distortion. The pre-distortion amplitude as received by the DAC 224 may decrease the pulse width of the DAC 224 generated pulse. The increase in amplitude (i.e., pre-distortion amplitude) may be made to compensate the clock jitter effect in the duty cycle of DAC 224 generated pulses. The clock jitter may shorten the duty cycle of a DAC 224 pulse. To this end, shortening of the duty cycle in a DAC 224 pulse may lead to decreased charging time in the DAC circuit 224, which may cause variations in the DAC 224 generated pulse amplitude. The clock jitter may also increase the duty cycle of a DAC 224 pulse. The increase of the duty cycle may increase the amplitude, although the increase in amplitude may be filtered to maintain a constant amplitude at the DAC 224 generated pulse output. The variations in amplitude due to clock jitter may affect the modulation of the RF signals, since phase modulation may require constant amplitude but a variation in phase for modulation.

The polar transmitter 200 combines the amplitude and phase component to describe the exact trajectory of the complex transmit signal. A short-variation, such as the clock jitter effect, may result in not meeting requirements in a spectral mask.

A mixer 230 combines the phase modulation and the amplitude coming from the DAC circuit to produce the phase modulated RF signal. The phase modulated RF signal may further be amplified and filtered to avoid harmonic distortions and periodic spectrum in the phase modulated RF signal.

Figure 3:
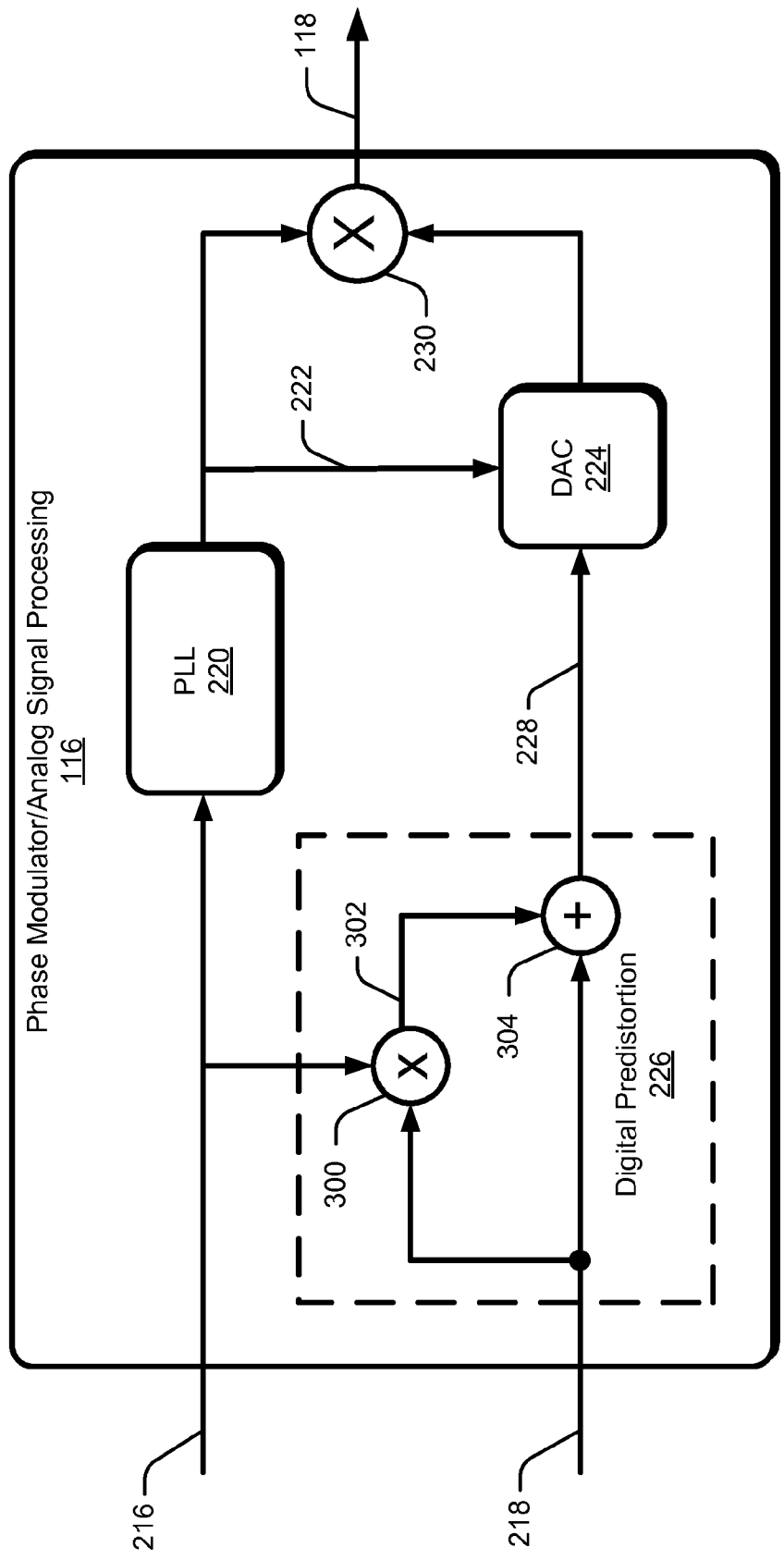
FIG. 3 is a block diagram showing a digital pre-distortion or digital multiplier circuit in the phase modulator.

FIG. 3 illustrates an exemplary embodiment of the Phase Modulator/Analog Signal Processing component 116. The amplitude signal 218 from the DSP (Amplitude) 214-2 may be multiplied with the modulating frequency by multiplier circuit 300. The output of multiplier 300 represented by signal 302 may be added with the amplitude from DSP (Amplitude) 214-2 by adder 304. The output of adder 304 (i.e., signal 228) may contain the pre-distortion amplitude which includes the increase in amplitude entering DAC circuit 224. The increase in the amplitude may shorten the pulse width, but may contain the same area covered by the regular pulse width and DSP (Amplitude) 214-2 amplitude, as further discussed below.

The system-inherent DAC 224 pulse width modulation may be deterministic. The charging error created by the DAC 224 pulse may be computed and compensated digitally by means of a digital pre-distortion of the DAC 224 amplitude.

The DAC 224 pulse width modulation may be compensated by digital amplitude pre-distortion. The DAC 224 pulse width $T_{\Delta\,mod}$ may be calculated from the sum of the digital base band pulse frequency $f_s$ and the PLL modulation frequency $f_{mod}$ through inversion according to the following equation (1).

$$T_{\Delta mod} = \frac{1}{f_{mod} + f_s} \quad (1)$$

The modulation frequency values $f_{mod}$ can be calculated from the difference of two phase values divided by $2\pi$.

$$f_{mod} = \frac{\varphi_i - \varphi_{1-i}}{2\pi} \quad (2)$$

Substituting $f_{mod}$ of equation (2) into equation (1), results in the following equation (3).

$$T_{\Delta mod} = \frac{T_1}{1 + \frac{\varphi_i - \varphi_{1-i}}{2\pi}} \quad (3)$$

The amplitude values are corrected by means of the digital pre-distortion in accordance with equation (4).

$$A_{pre} = A_1\left(1 + \frac{\varphi_i - \varphi_{1-i}}{2\pi}\right) \quad (4)$$

Multiplying equations (3) and (4) shows that the pulse area covered by the amplitude pre-distortion and the smallest pulse width in equation (1) may have the same area covered by the DSP (Amplitude) 214-2 amplitude ($A_1$) and regular period ($T_1$). The digital calculations in equation (4) may show spectral improvement by way of the digital pre-distortion or digital multiplier circuit. The spectral requirements may be set for transmitters and receivers to meet the minimum requirements for the system used (i.e., UMTS, GSM, etc.)

Figure 4:
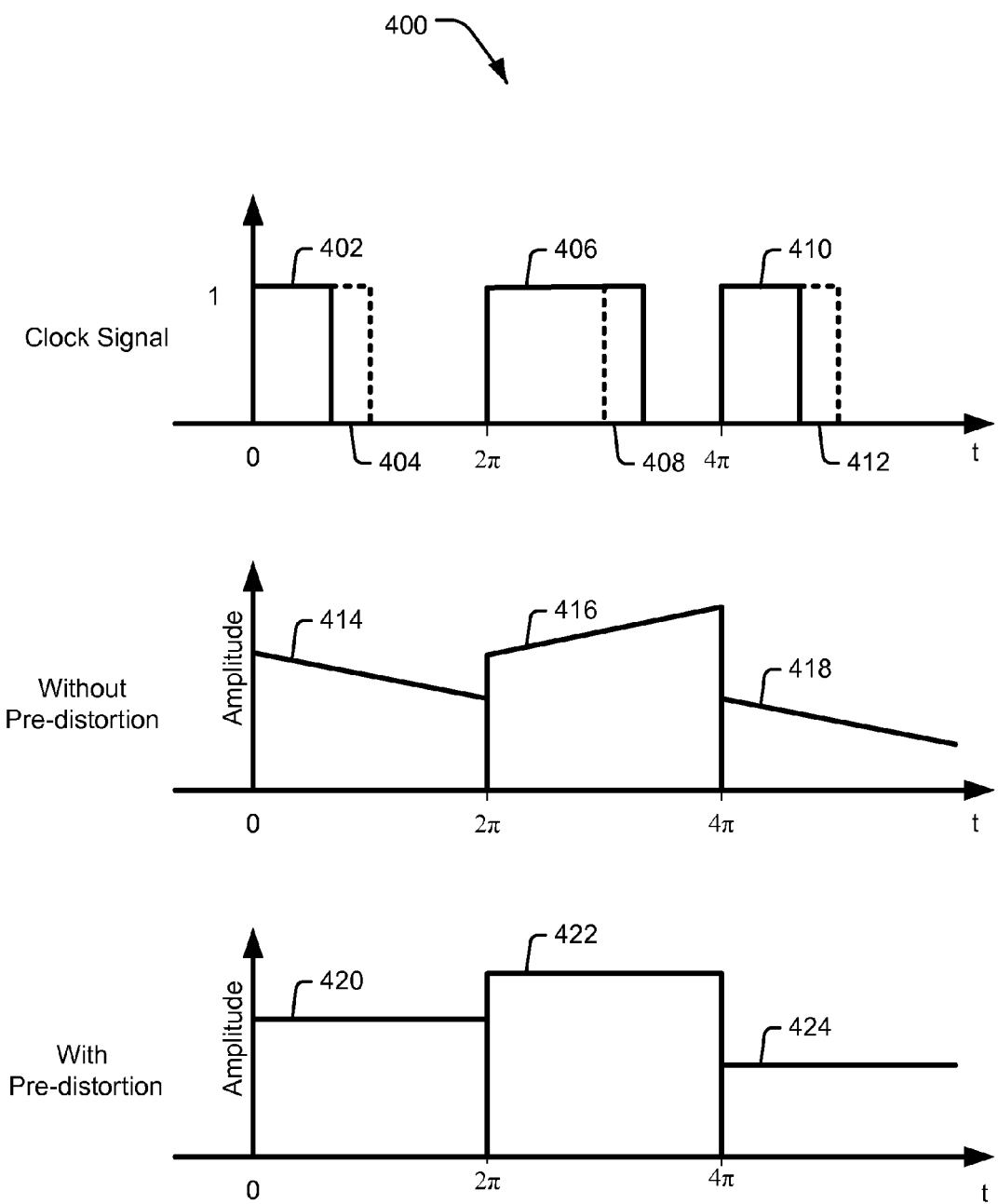
FIG. 4 is graph showing the clock jitter and amplitudes of the DAC generated pulses.

FIG. 4 illustrates an exemplary graphs 400 describing the effects of digital pre-distortion in DAC (e.g., DAC 224) generated pulses. Signal 402 may be the high state of the modulated clock pulse which may have a decrease in the duty cycle due to jitter effect 404. The ideal trailing edge for the clock signal may be located at the dotted line in jitter effect 404. The clock pulse changes every cycle of $2\pi$ and the DAC generated pulses may also change in every cycle of $2\pi$ in the clock. The period for the clock may vary, since the clock may be modulated from the PLL. The duty cycle of high state 406 may be extended by the jitter clock signal which may be shown by the jitter width 408. High state 410 may be another clock cycle where the jitter effect 412 decreases the duty cycle of the input amplitude in the DAC.

The graph of the DAC generated pulses without the digital pre-distortion is illustrated by the second graph labeled "Without Pre-distortion". The first cycle may result in a decrease in amplitude 414 at the output of the DAC, because the jitter effect may lessen the charging time for the DAC circuit. The decrease in the charging time may vary the amplitude of the pulse which may lead to a non-constant amplitude output of the DAC pulse signal. Amplitude 416 may also increase, because of the extended duty cycle in the amplitude signal. The extended duty cycle may cause variation in the amplitude of the DAC pulse which may lead to signal error in the modulator. Amplitude 418 may be another DAC pulse with a decrease in duty cycle due to jitter effect.

The graph of the DAC generated pulses containing the digital pre-distortion may be illustrated by the third figure labeled "With Pre-distortion" in graph 400. Amplitude 420 may be a constant amplitude, due to the increased amplitude in the DAC input. The increased amplitude with a lesser pulse width may be able to charge right away the DAC to produce a constant DAC 224 generated pulses. The jitter effect in the duty cycle of the DAC pulse may be minimized or eliminated, because of the compensated amplitude. Amplitude 422 may contain constant amplitude of the DAC pulse because the jitter effect of extending the duty cycle may not affect the charging time of the DAC. The DAC may filter the increase in the amplitude to maintain constant amplitude in the DAC generated pulse. Amplitude 424 may be another DAC pulse generated that may have constant amplitude even though the jitter effect lessened the duty cycle of the amplitude signal.

Figure 5:
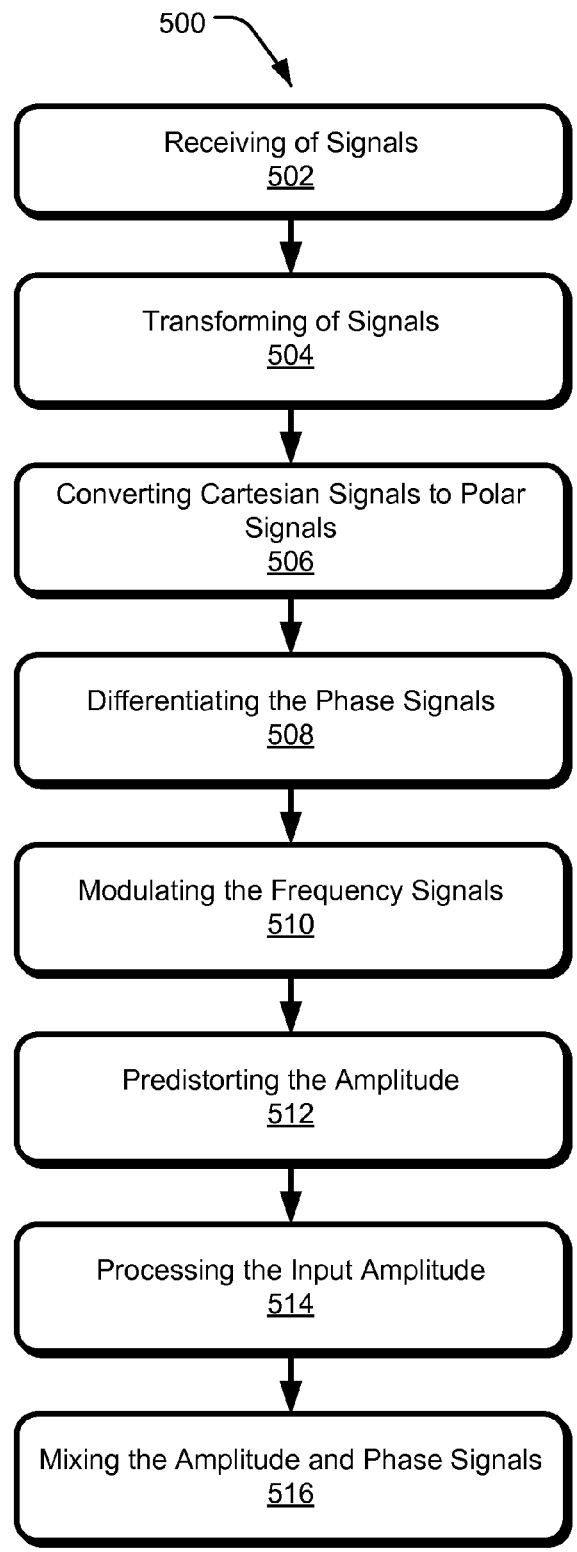
FIG. 5 is a block diagram showing the methods and processes for the digital pre-distortion or digital multiplier circuit.

FIG. 5 illustrates an exemplary method 500 describing the methods and processes for implementation of a digital pre-distortion circuit. In one implementation, the exemplary method 500 can be implemented in the transceiver 100. The exemplary method 500 is described with reference to FIGS. 1-4. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 502, receiving of data signals is performed. The data signals from the peripherals, camera, display, etc. may be received by the Input/Output component or I/O. The I/O may convert the analog data signals into digital data signals. The digital data signals from the peripherals, camera, display, etc. may be maintained in the same state.

At block 504, transforming of the data signals is performed. The digital data signals may be processed by the Input/Output component to produce the amplitudes of the Inphase signal (I) and Quadrature phase signal (Q).

At block 506, converting of the Cartesian data signals into polar data signals is performed. The Coordinate Rotation DIgital Computer (CORDIC) component may convert the amplitudes of I and Q into its polar equivalence. The polar equivalence may be the amplitude and phase of the digital data signal.

At block 508, differentiating of phase signals is performed. A differentiator component may differentiate the phase of the digital data signal to get the modulating frequency needed for the phase locked loop (PLL). The PLL may be used for phase modulation and the clock signals may be re-used in the DAC circuit to make the amplitude in synchronous with the phase signal.

At block 510, modulating the data signal frequency is performed. The PLL may perform the phase modulation by producing an output which may be a variation of the modulating frequency at the input. The input modulating frequency to the PLL may result to adjustment in the frequency of the PLL oscillator which may use a feedback control to produce the PLL phase modulation. The modulated output of the PLL may also be re-used as a clock signal to the DAC.

At block 512, pre-distorting of the input amplitude is performed. The amplitude input signal may be increased by the digital pre-distortion or digital multiplier component through multiplication of the DSP (Amplitude) 214-2 amplitude with the modulating frequency. The product of multiplying the DSP (Amplitude) 214-2 amplitude with the modulating frequency may be added again with the DSP (Amplitude) 214-2 amplitude to produce the pre-distortion amplitude which includes an increase in amplitude amount.

At block 514, processing of the input amplitude is performed. The DAC may process the pre-distortion amplitude so that constant amplitude may be generated at the DAC pulse. The jitter effect in the modulated clock signal may change the duty cycle of the amplitude in the DAC circuit which may lead to an amplitude variation. The pre-distortion amplitude may correct the amplitude variation by shortening the pulse width of the amplitude signal. The pre-distortion amplitude containing a short pulse width may compensate for the smaller duty cycle in the circuit by completing the charge in the DAC circuit before the jitter effect may even apply. The increase in duty cycle which may include an increase in the amplitude of the DAC generated pulse may be filtered by the DAC circuit to produce a constant amplitude pulse.

At block 516, mixing the amplitude and the phase signals is performed. A mixer may combine the phase modulation and the amplitude coming from the DAC circuit to produce the phase modulated RF signal.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, different digital pre-distortions and schemes may be configured to reduce or eliminate the effect of clock jitter and other noise.

What is claimed is:

1. A digital pre-distortion component comprising:
   a multiplier component that receives a baseband amplitude signal and multiplies the baseband amplitude signal with a modulating frequency, and produces an output signal; and
   an adder component that receives the output signal and adds the baseband amplitude signal and generates a pre-distortion amplitude output signal.

2. The digital pre-distortion component of claim 1, wherein the digital pre-distortion component is included in a phase modulator and analog signal processing component.

3. The digital pre-distortion component of claim 1, wherein the multiplier component receives the baseband amplitude signal from a digital signal processing (DSP) component of a baseband component in a transceiver.

4. The digital pre-distortion component of claim 1, wherein the modulating frequency is received from a baseband phase signal.

5. A polar transmitter comprising:
   a digital signal processor that is configured to generate a baseband amplitude signal; and
   a digital pre-distortion component that is configured to multiply the baseband amplitude signal with a modulating frequency to generate an output signal, and to add the baseband amplitude signal with the output signal to generate a pre-distortion amplitude signal to compensate for clock jitter error in the polar transmitter.

6. The polar transmitter of claim 5, wherein the digital signal processor includes a digital signal processing component for phase, and a digital signal processing component for amplitude that provides the baseband amplitude signal.

7. The polar transmitter of claim 5, wherein the digital signal processor includes a Computer Rotation Digital Computer (CORDIC) component to convert amplitudes of In-Phase and Quadrature baseband signals into equivalent polar signals.

8. The polar transmitter of claim 5, wherein the digital pre-distortion component is included in a phase modulator component.

9. The polar transmitter of claim 5, further comprising a phase locked loop that is configured to process the modulating frequency.

10. The polar transmitter of claim 5, wherein the polar transmitter is included in a transceiver of a wireless communication device.

11. A method, comprising:
    by a polar transmitter,
    generating a baseband amplitude signal;
    multiplying the baseband amplitude signal with a modulating frequency to generate an output signal, and adding the baseband amplitude signal with the output signal to generate a pre-distortion amplitude signal to compensate for clock jitter error in the polar transmitter.

12. The method of claim 11, further comprising:
receiving analog signals;
converting the analog signals to digital signals;
processing the digital signals to produce baseband in-phase and quadrature phase signals; and
processing the baseband in-phase and quadrature phase signals to produce the baseband amplitude signal and the modulating frequency.

\* \* \* \* \*